(12) United States Patent
Henoch

(10) Patent No.: US 7,222,985 B2
(45) Date of Patent: May 29, 2007

(54) ILLUMINATED ARTICLE-LOCATOR

(76) Inventor: Susan Henoch, 516 Princeton/Kingston Rd., Princeton, NJ (US) 08540

( * ) Notice: Subject to any disclaimer, the term of this patent is extended or adjusted under 35 U.S.C. 154(b) by 332 days.

(21) Appl. No.: 11/067,308

(22) Filed: Feb. 25, 2005

(65) Prior Publication Data

US 2005/0195606 A1    Sep. 8, 2005

Related U.S. Application Data

(63) Continuation-in-part of application No. 10/755,090, filed on Jan. 8, 2004, now abandoned, which is a continuation-in-part of application No. 09/848,526, filed on May 3, 2001, now abandoned.

(60) Provisional application No. 60/201,982, filed on May 3, 2000.

(51) Int. Cl.
*F21V 8/00* (2006.01)

(52) U.S. Cl. ............... 362/196; 362/184; 362/191; 362/802; 362/612

(58) Field of Classification Search ............ 362/196, 362/184, 190, 191, 200, 208, 802, 612, 613, 362/619, 620, 555, 580, 581
See application file for complete search history.

(56) References Cited

U.S. PATENT DOCUMENTS

| 4,225,808 A | 9/1980 | Saraceni |
| 4,868,543 A | 9/1989 | Binkley |
| 5,532,680 A | 7/1996 | Ousborne |
| 6,118,375 A | 9/2000 | Duncan |
| 6,224,235 B1 * | 5/2001 | Parker ............... 362/190 |
| 6,265,984 B1 | 7/2001 | Molinaroli |
| 6,334,692 B1 * | 1/2002 | Hsueh ............... 362/116 |
| 6,428,179 B1 | 8/2002 | Saffron |
| 6,497,495 B1 * | 12/2002 | Janz ............... 362/194 |
| 6,742,913 B2 * | 6/2004 | Deutsch ............... 362/253 |
| 2002/0089845 A1 | 7/2002 | Altman |

* cited by examiner

*Primary Examiner*—Laura Tso
(74) *Attorney, Agent, or Firm*—Darby & Darby

(57) ABSTRACT

An illumination device includes a waveguide body, a source of illumination, a triggering mechanism, a battery, a connecting ring, and controlling circuitry. The device is attached to an article (such as a set of keys) using the connecting ring. The source of illumination includes at least one light emitting diode (LED) whose output is in optical communication with the waveguide body so that when lit, the LED's output illumination is transmitted throughout the waveguide body. Power to the LED(s) is supplied by the battery and is controlled by the controlling circuitry and the triggering mechanism. The triggering mechanism includes a motion or movement detector, preferably based on an electro-mechanical spring-switch. The light from the LED transmits throughout the waveguide body creating an even, soft glow-like illumination through the entire body thereby illuminating the relatively large waveguide body of the device. In other aspect, the illumination device includes two or more LEDs with at least two being primary colors such that in one mode of operation of the illumination module, the two LEDs are illuminated simultaneously to form a secondary color that is illuminated in the waveguide body. In another operating mode, the LEDs are illuminated successively.

23 Claims, 8 Drawing Sheets

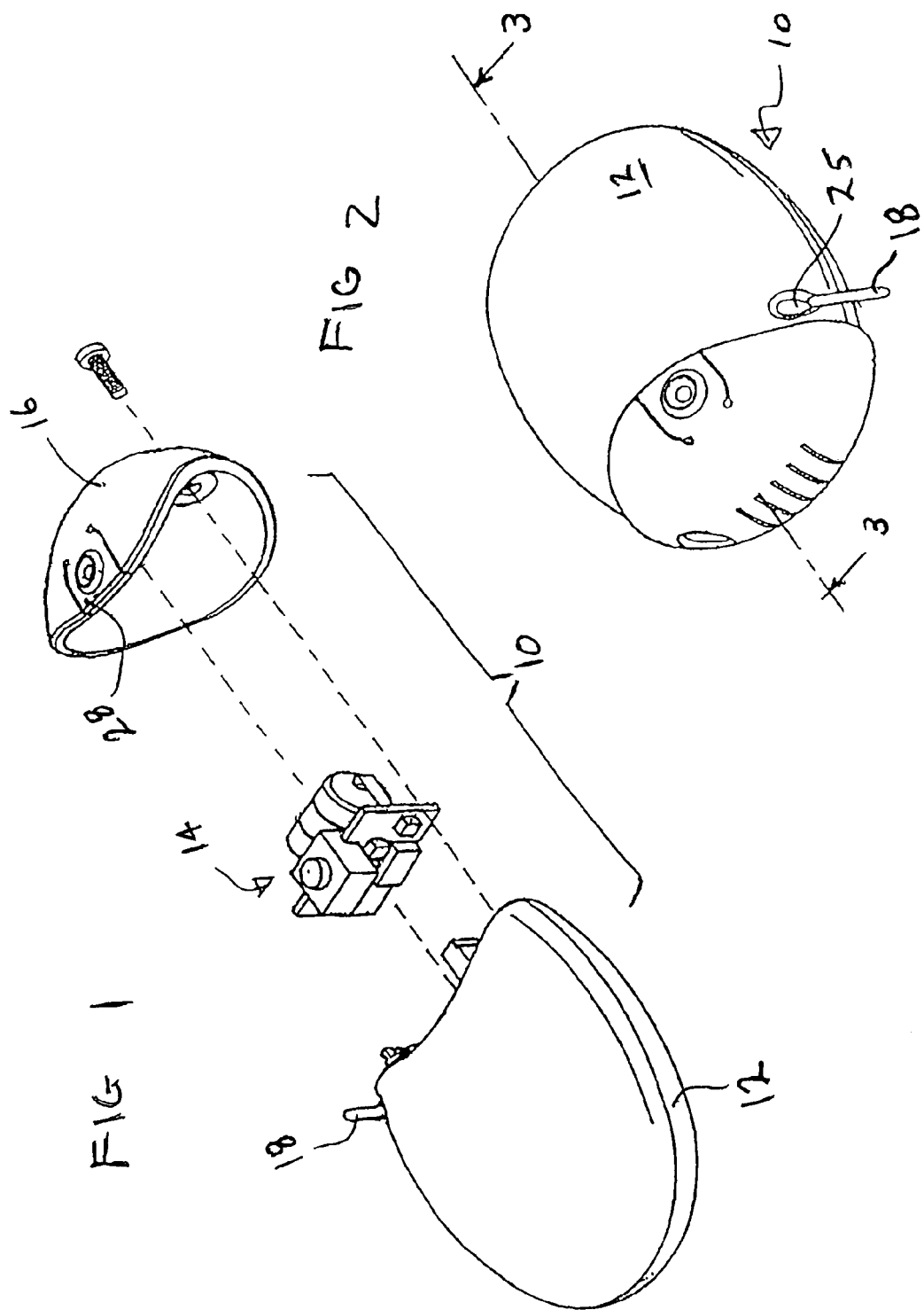

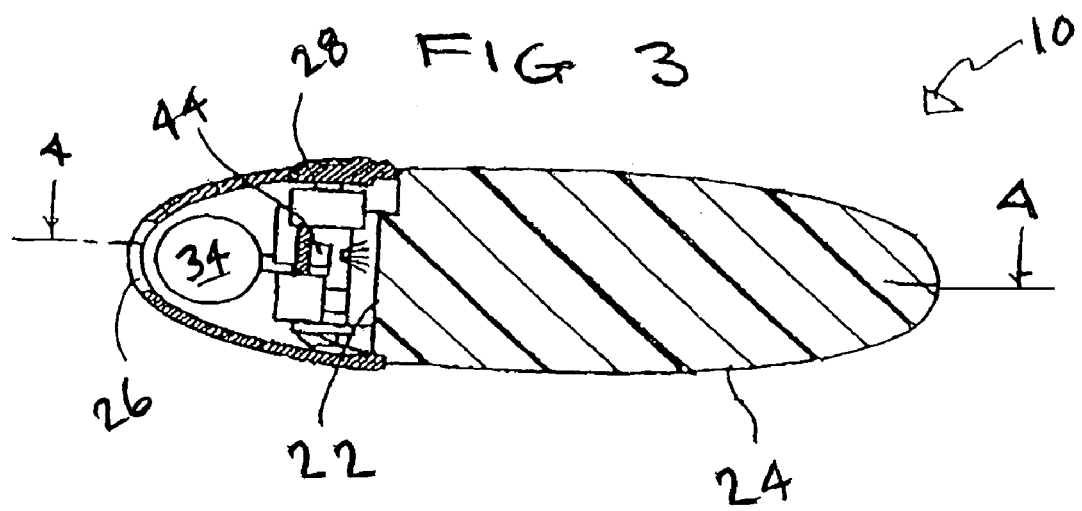
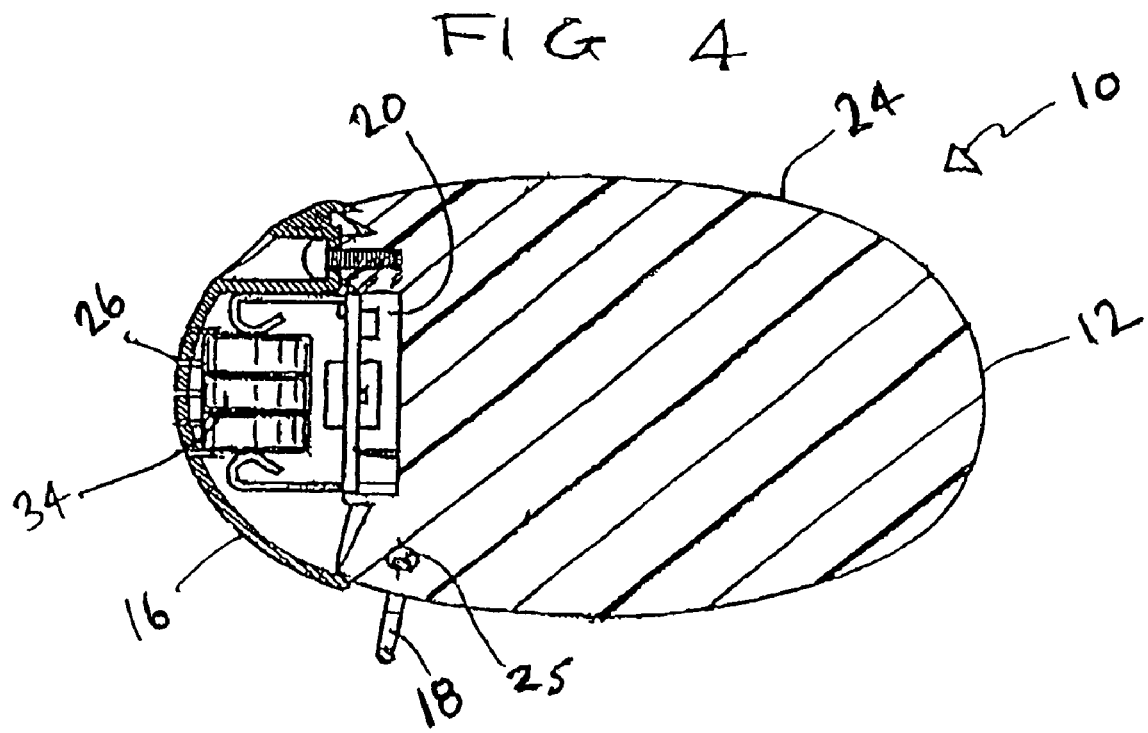

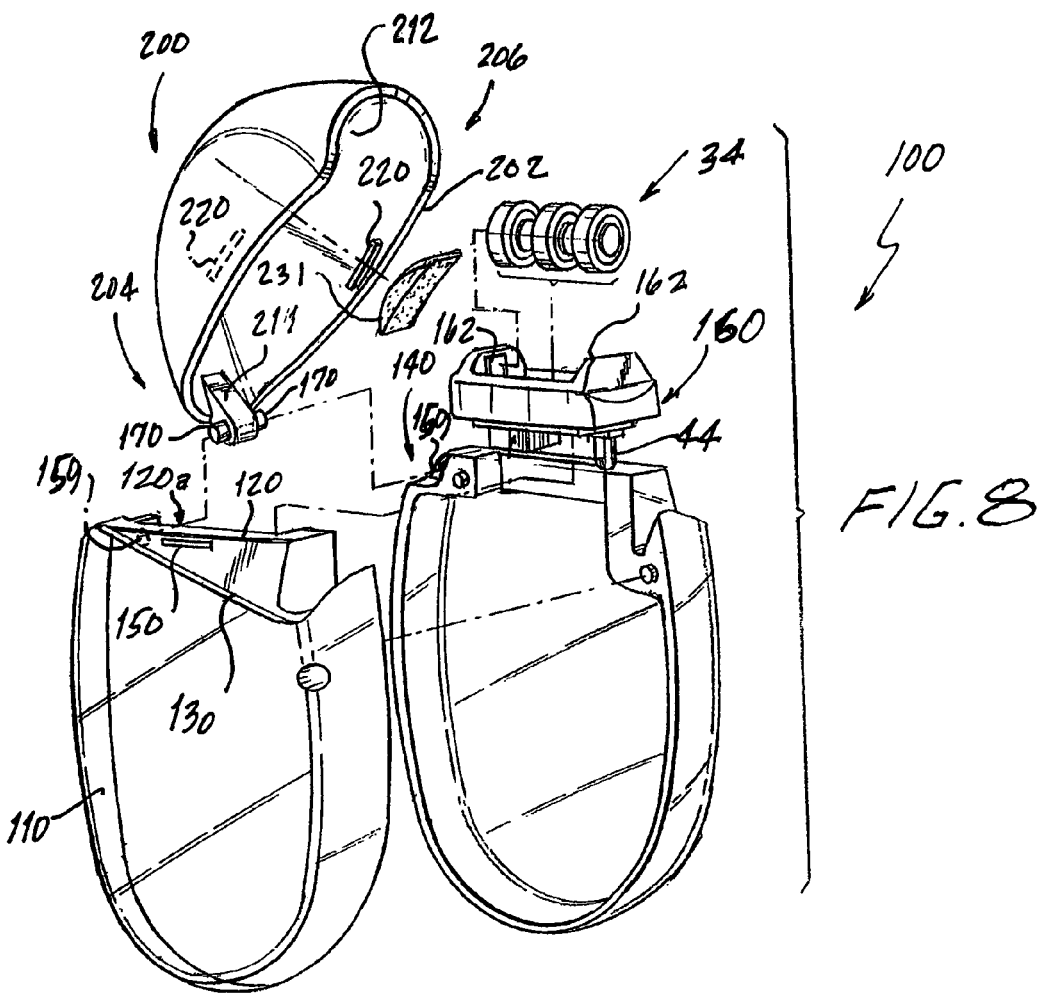
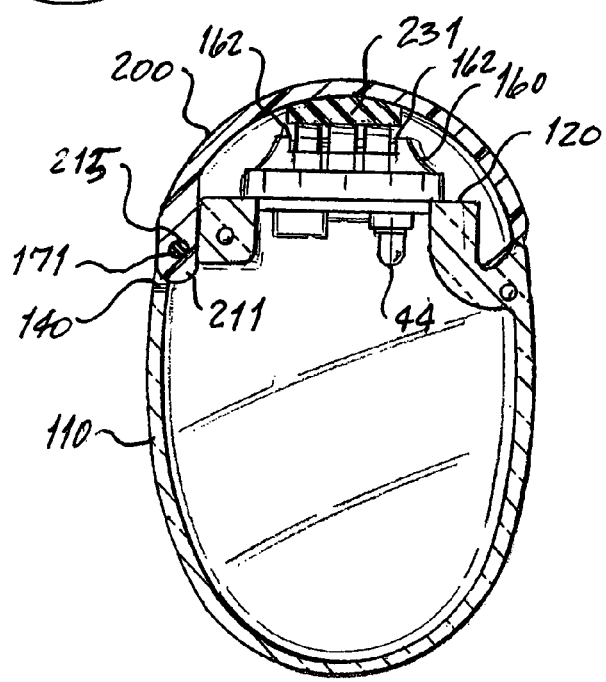
FIG. 8
FIG. 9

ILLUMINATED ARTICLE-LOCATOR

CROSS-REFERENCE TO RELATED APPLICATIONS

This patent application is a continuation-in-part of U.S. patent application Ser. No. 10/755,090, filed Jan. 8, 2004 now abandoned, which is a continuation-in-part of U.S. patent application Ser. No. 09/848,526, filed May 3, 2001 now abandoned, which claims the priority of U.S. provisional patent application No. 60/201,982, filed in the U.S. Patent and Trademark Office on May 3, 2000, all of which are incorporated herein by reference.

TECHNICAL FIELD

This invention generally relates to illuminated devices, and more particularly, to such devices that may be attached to articles and used to help reveal their location within an environment.

BACKGROUND

In this complex world, it is not uncommon to misplace any of a variety of articles we tend to use each day, such as keys, eyeglasses, and wallets. We often misplace these articles because we put them down at a particular location, become distracted, and then leave the area probably thinking about something else. These items are rarely actually lost, just misplaced and their owner typically won't realize that an item is missing until, of course, they need to use it.

To overcome this problem and to help people keep tract of their everyday belongings, a variety of devices have been developed, many of which are based on radio frequency transponder technology. These prior art locating devices usually include a transponder and a transmitter. The user would attach the transponder to an article that he or she wishes to keep track of (prior to it being lost). Should the item become misplaced, the owner simple activates the transmitter so that a radio frequency signal is transmitted within a prescribed area. If the transponder (and therefore, the attached item) is within that area, the RF signal will cause the transponder to "respond", usually audibly, such as a beeping sound, but may also include an appropriate illumination source as well.

These prior art item-locating devices are unnecessarily complex and require that the user carry the transmitter portion, which is yet another small item to keep track of and which will probably just get lost, anyway. Also, these RF item-locating devices of the prior art are only useful at finding items that have been misplaced in a relatively open and spacious environment, such as on a desk or in a car. These devices fail to help locate an item that is among many other items in a relatively closed and small environment, such as finding a set of keys in a purse filled with other items.

Applicant has recognized the need to provide a simple illumination device that may be attached to an item so that upon the activation of the device, the item may be easily found.

SUMMARY

An illumination device includes a waveguide body, a source of illumination, a triggering mechanism, a battery, a connecting ring, and controlling circuitry. The device is preferably attached to an article (such as a set of keys) using the connecting ring. The source of illumination includes at least one light emitting diode (LED) whose output is in optical communication with the waveguide body so that when lit, the LEDs output illumination is transmitted throughout the waveguide body. Power to the LED(s) is supplied from the battery, as controlled by the controlling circuitry and the triggering mechanism. The triggering mechanism includes a motion or movement detector, preferably based on an electro-mechanical spring-switch. This type of switch sends a triggering signal to the controlling circuitry when movement of the device is sufficient to displace the spring portion of the triggering mechanism into contact with an electrical terminal.

A method for using the device includes attaching the device to an article, such as a set of keys and shaking the keys (directly or indirectly) to cause the triggering mechanism to signal the controlling circuitry, which in turn, activates at least one LED. The light from the LED transmits throughout the waveguide body creating an even, soft glow-like illumination through the entire body thereby illuminating the relatively large waveguide body of the device.

According to one aspect of the present invention, the device includes a cap that is snap-fittingly attached to a translucent waveguide body to permit the user to access a power source under prescribed circumstances. In other aspect, the illumination device includes two or more LEDs with at least two being primary colors such that in one mode of operation of the illumination module, the two LEDs are illuminated simultaneously to form a secondary color that is illuminated in the waveguide body. In another operating mode, the LEDs are illuminated successively.

BRIEF DESCRIPTION OF THE DRAWINGS

FIG. 1 is an assembly view of an illumination device, according to the invention;

FIG. 2 is a perspective view of the illumination device, according to the invention;

FIG. 3 is a sectional view of the illumination device, taken along the lines 3-3 of FIG. 2, showing details of the illumination module, according to the invention;

FIG. 4 is a sectional view of the illumination device, taken along the lines 4-4 of FIG. 3, showing details of the illumination module, according to the invention;

FIG. 8 is an exploded perspective view of an illumination device according to another embodiment;

FIG. 9 is a cross-sectional view of an illumination device of FIG. 8;

DETAILED DESCRIPTION OF THE PREFERRED EMBODIMENTS

Figure 5:
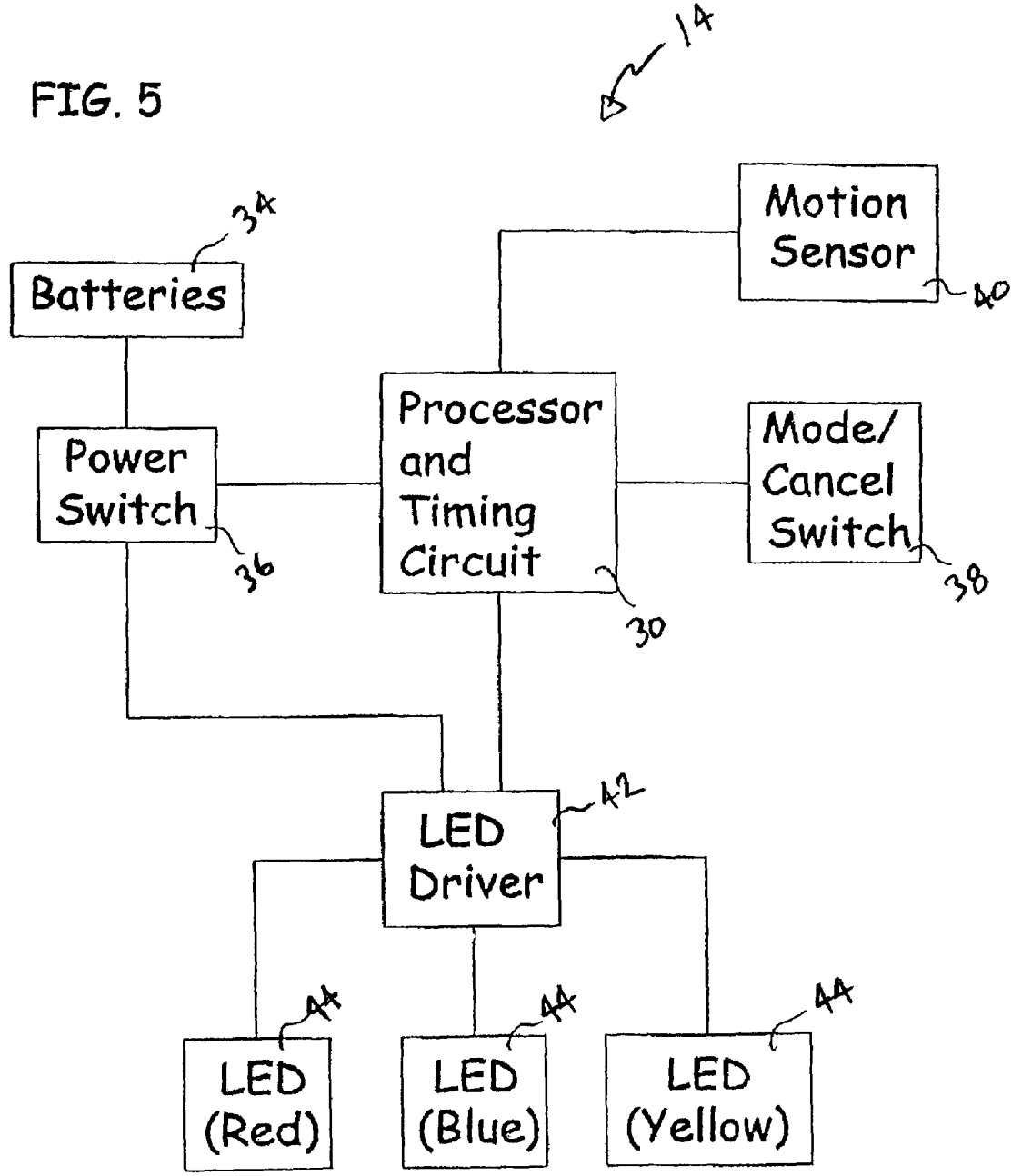
FIG. 5 is an illustrative schematic of the operation of the illumination module and LED controlling circuitry, according to the invention.
Figure 6:
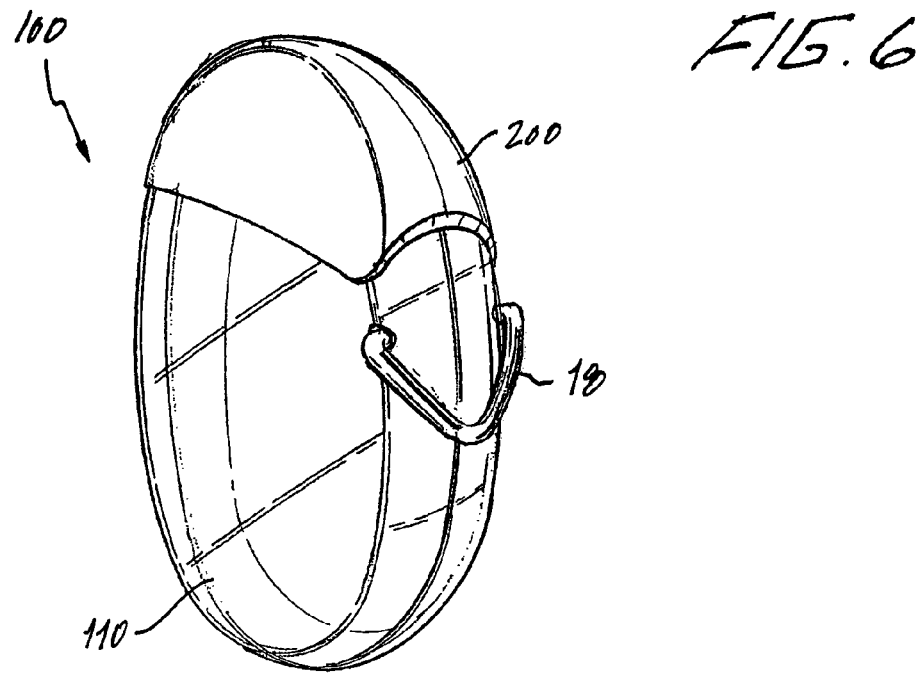
FIG. 6 is a perspective view of an illumination device according to another embodiment illustrating the pivotable cap in the closed position.
Figure 7:
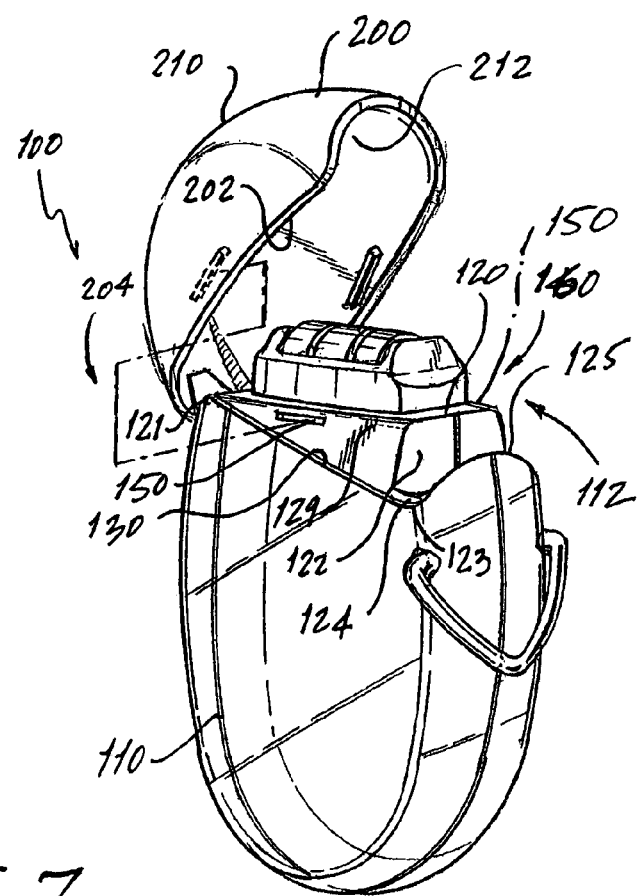
FIG. 7 is a perspective view of an illumination device of FIG. 6 with the pivotable cap in an open position, thereby showing the illumination module thereof.

Referring to FIG. 1, an illumination device 10, according to the invention is shown, including a waveguide body 12, an illumination module 14, a cap 16, and a connecting ring 18. Waveguide body 12 is preferably ellipsoidal in shape (similar to the shape of a slightly flattened egg with smooth rounded edges) and includes a module-receiving recess 20 defining a generally flat light receiving surface 22, located at one end, and further includes a outer diffusing surface 24 (such as a frosted surface). Of course, waveguide body 12 can take on any suitable shape without departing from the invention. Waveguide body 12 is preferably made from an optical-grade plastic, such as Acrylic, or a plastic that can function, at least to some extent, as an optical waveguide, i.e., it is capable of transmitting light that is projected at light-receiving surface 22 throughout the body to the frosted surface 24.

Waveguide body 12 is preferably molded as a single unit, however, the body may alternatively be molded as two halves and secured together. Also, the waveguide body 12 may be molded around illumination module 14, thereby encasing the operating circuitry and batteries used to illuminate device 10. This also ensures that device 10 will endure a variety of environmental conditions that are typically hazardous to electronic components. These may include water (liquid or moisture), dust, insects, impact (such as if the device is dropped), and unintentional prying forces, such as from other objects.

Connecting ring 18 is secured to waveguide body 12, through an opening 24, and may be used to secure device 10 to an article (not shown), such as a set of keys.

Module-receiving recess 20 is sized and shaped to snugly receive illumination module 14, which may be secured therein using any appropriate means including mechanical screw fasteners, snap-arrows, clips, or even an appropriate adhesive. As described below, cap 16 is secured to waveguide body 12, covering the illumination module 14. Cap 16 may include vents 26 to help cool the illumination module 14, and an integrally formed pivotal switch-contacting tab 28. Cap 16 is preferably shaped to compliment the shape of the waveguide body 12 so that the body 12 and the cap 16 together form a desired uniform and continuous shape, such as an ellipsoidal shape.

Referring to FIGS. 1 and 5, light illumination module 14 includes a processor 30, (which preferably includes a timing circuit and an electronic memory for storing operating instructions), a power supply 34, such as batteries, a power switch 36 (optional), a mode/cancel switch 38, a motion/movement switch 40, an LED-driver circuit 42, and at least one light emitting diode (LED) 44. Three LEDs are preferably used, the light output of each being a different color (a single LED with multiple colored outputs may also be used). All of the above-described components of the illumination module 14 are preferably all commonly secured to a circuit board 46. Appropriate use of semiconductor components and/or surface mounted devices may be utilized to make the light-illumination module 14 power-efficient and as small as possible, as understood by those skilled in the art.

Power supply 34 provides the electrical power requirements for processor 30, LED driver circuit 42, and LEDs 44. If power switch 36 is used, it would selectively connect power supply 34 to processor 30 and LED driver 42 (which would, in turn, power each LED, as necessary). Since the illumination module 14 is sensitive to motion, as described below, power switch 36 is not necessary, since no LED will illuminate unless the device 10 is moved in a jarring manner, sufficient to trigger motion/movement switch 40, and the device will therefore conserve power until it is used.

As is understood by those skilled in the art of electronics, LED driver circuit 42 is used to power up each of several connected LEDs, as instructed by processor 30. Processor 30 inputs signals from motion/movement switch 40, and mode/cancel switch 38. If the device is moved quickly enough, the motion/movement switch 40 (which is essentially a spring switch) will effectively send a "trigger" signal to processor 30, which will in turn, instruct LED driver circuit 42 to illuminate at least one LED 44, according to a preset sequence code (software). A timing circuit is preferably included within processor 30 to control the length of time that any LED illuminates, once triggered to do so (such as 10 seconds). Mode/cancel switch is connected to processor 30 and is used to turn off any illuminating LED prior to completion of its activation time (e.g., 10 seconds).

Mode/cancel switch 38 may also be used to select illumination characteristics, such as how each LED illuminates, their respective duration and color, and sequence. For example, three LEDs may be used, each emitting a different color, e.g., red, yellow, and blue. Processor 30 may be used to allow the red LED to flash at a first rate, the yellow LED at a second rate, and the blue LED perhaps to illuminate continuously, for 10 seconds. In another "mode", for example, processor 30 would alternate illumination of each LED 44, from one color to the next, allowing a slow transition from one color to the next. Many other sequences and illumination effects can be programmed into the processor 30 and selected by the user (or may alternate automatically).

Regardless, when lit, the light from the LED transmits throughout the waveguide body creating an even, soft glow-like illumination through the entire body thereby illuminating a major portion of device 10. The intensity of the resulting glow-like illumination may be designed according to the particular application of the device. In most applications, the device is to be used in darker environments, such as within a container (pocket book, bag, briefcase, etc.), but of course, may be adjusted so that the illumination can be seen in brighter ambient conditions.

In use, the device 10 is intended to be secured to any item or article that the user would like to quickly find in a dark enclosing environment. Device 10 is particularly useful when secured to an article that is typically stored within a carrying bag, large pocket-book, briefcase, pocket, or a backpack, such as a set of car keys, for example. Typically, there are many different items held in such carriers that it is often difficult to find any one item. By attaching the present device 10 to an item of high use and importance (e.g., car keys), the user merely has to shake their carrier (such as their briefcase or pocket book) to cause motion/movement sensor 38 to cause processor 30 to instruct at least one LED 44 to illuminate the entire waveguide body 12, thereby quickly revealing its location (along with its attached item) within the carrier among the other items.

Applicant also contemplates the use of illumination device 10 as something to wear, as a form of jewelry. In this application, waveguide body 12 would be shaped in decorative and lightweight forms so that they may be attached to decorative chains, earrings, rings, broaches, pins, (including pierced jewelry), and hair-supported clips and devices. The illumination device 10, in this application, would illuminate in response to movement of the wearer of the jewelry.

Applicant further contemplates incorporating light illuminating module 14 within a battery pack of a cellular telephone (not shown) so that if the user shakes the phone (directly or indirectly) at least one LED will illuminate so that the location of the phone is revealed. With this application, the LEDs and controlling circuitry can be powered by the battery of the cellular telephone. If the phone is in use, the LED circuitry can be deactivated.

Now referring to FIGS. 6-10 which illustrate an illumination device 100 according to another embodiment. The illumination device 100 is similar to the device 10 and therefore like components are numbered alike. The device 100 includes a waveguide body 110 and the illumination module 160 as well as a cap 200 and the connecting ring 18. One of the main differences between the illumination device 100 and the device 10 is the construction of the cap 200 and the waveguide body 110. More specifically, the cap 200 is of a hinged or pivotable type as opposed to being secured to the waveguide body 110 by a fastener, e.g., a screw.

The waveguide body 110 is preferably ellipsoidal in shape and has features formed at a first end 112 that permit the reception of the illumination module 14. For example, the first end 112 includes a substantially planar platform 120 on which the illumination module 14 is mounted or the platform 120 that preferably has an opening formed therein for at least partially receiving the illumination module 14. At one end of the platform 120, a vertical ledge or shoulder 122 is formed and extends down to a landing 124 that is formed at the base of the shoulder 122. The width of the platform 120 is less than the width of the surrounding of the body 110 and therefore, a lip or ridge 130 is formed around the platform 120 for receiving a perimeter edge of the cap 200 such that the cap 200 rests thereon in a closed position. The lip 130 extends substantially the entire width of the body 110 and therefore extends from an end 121 of the platform adjacent to where the cap 200 is pivotally coupled to the body 110. The lip 130 is formed at an angle relative to the platform 120 in that the lip 130 is angled downward from the end 121 to an opposite end 123 where the lip 130 extends beyond shoulder 122 and surrounds the landing 124 and terminates in a curled lip portion 125 which is curled up to provide a resting surface for the cap 200. As will be appreciated by viewing FIG. 7, the shape of the lip 130 is complementary to the shape of the bottom edge 202 of the cap 200.

The platform 120 has a pair of slots or grooves 150 formed therein at or proximate to an upper face 129 of the platform 120 for mating with complementary features that are formed as part of the cap 200 to effectuate a releasable locking between the cap 200 and the body 110. Preferably, the slots 150 are formed in a central section of the platform 120. In the illustrated embodiment, the slots 150 have a rectangular shape; however, it will be appreciated that the slots 150 can have any number of other shapes so long as the slots 150 serve to releasably interlock the cap 200 to the body 110.

As previously mentioned, the cap 200 is pivotally coupled to the body 110 such that the cap 200 can be easily and pivotally opened and closed. The cap 200 can be formed of any number of different metals, such as metals and plastics, and it will be appreciated that the cap 200 does not have to have transparent characteristics but rather can be completely opaque to light transmission. As best seen in FIG. 8, the cap 200 is a generally curved hollow member (e.g., dome shaped) that has an upper face 210 and an opposing lower underside face 212. The cap 200 has a first end 204 at which a protruding hinge arm 211 is formed and an opposing arcuate second end 206 that mates with the curved lip portion 125.

In order to permit the cap 200 to pivot within and relative to the body 110, the body 110 has a groove or channel 140 formed therein to receive the protruding hinge arm 210 of the cap 200. The groove 140 is open at one end that is adjacent the upper face of the platform 120 and terminates at a curved end.

A pair of openings 159 are formed in the sides of the body 110 halves and open into the groove 140 so as to permit reception of pivot posts 170 therein. The pivot posts 170 are integrally molded with hinge arm 211, and are retained in openings 159 upon assembly of the body 110, thereby allowing cap 200 to pivot about posts 170. As seen in FIG. 9, the pivot pin 171 can actually be a single pin which passes through openings 159 of the body 110 and a bore 215 of hinge arm 211, thereby capturing, hinge arm 211 in groove 140 upon assembly of the body halves.

On the bottom underside surface 212 of the cap 200, a pair of bosses or ridges 220 are formed and are complementary to the slots 150. The bosses 220 are formed and are orientated so that when the cap 200 is closed, the bosses 220 travel along the side walls of the platform 120 and drop into the slots 150, resulting in a frictional fit being formed therebetween. In other words, as the cap 200 is closed, the bosses 220 travel past the illumination module 160 and then travel along the side walls of the platform 120 until the bosses 220 interlock with the slots 150. In addition, when the bosses 220 are disposed in the slots 150, the bottom edge 202 of the cap 200 seats against the lip 130.

The illumination module 160 is similar to the illumination module 14 and is desired to be easily coupled to the body 110. The illumination module 160 generally functions in the same manner as the illumination module 14 and includes the LED 44 as well as power source 34 that is disposed between two contacts 162. These components are operatively coupled to a substrate that is typically in the form of a printed circuit board or other type of processor. An exemplary power source 34 is in the form of one or more batteries that are arranged side-by-side with respect to one another. The illumination module 160 is disposed on the upper face of the platform 120 such that at least a portion thereof is disposed within the opening 120a formed in the platform 120. More specifically, the portion that sits within the opening 120a is the side of the module 160 that includes the LED 44 so that the light generated from the LED 44 is directed towards the body 110 for illumination thereof. The coupling between the illumination module 160 and the body 110 can be accomplished in a number of different ways including the existence of a frictional fit between these two components. In addition, an adhesive or the like can be disposed on an underside of the illumination module 160 to facilitate or effectuate a coupling between the module 160 and the body 110.

The portion of the illumination module 160 that is disposed above the upper face of the platform 120 is constructed so that when the cap 200 is pivoted into its closed position, a space is formed between the module 160 and the cap 200. A resilient member bumper 231 can optionally be included as part of the underside of the cap 200 for contacting the power source 34 to further ensure that the power source 34 does not come dislodged from its position between the contacts 162. For example, a rubber pad or the like can be used as member 231 and can be adhesively attached to the underside of the cap 200 with the opposite face of the member 231 being in contact with the power source 34, e.g., batteries. The illumination module 160 is therefore of the type that can be easily installed in the body 110.

It will be appreciated that the cap 200 offers a number of advantages with one primary advantage being that the power source 34 is readily accessible by the consumer. The power source 34 is the only part of the illumination module 160 that it is expected will need future servicing/replacement since as is well known, batteries lose their power over time and require replacement. Thus, the use of a pivotal cap 200 permits the user to simply pivot the cap 200 and easily gain access to the batteries. This is an improvement over other designs including the embodiment shown in FIGS. 1-4 where the cap is securely attached to the body by means of a fastener. When a fastener is used, some type of a tool is required to remove the fastener in order for the cap to be detached and removed and therefore, this removal process is more complex and requires more time since a tool is required and undoing the fastener takes some time.

Figure 10:
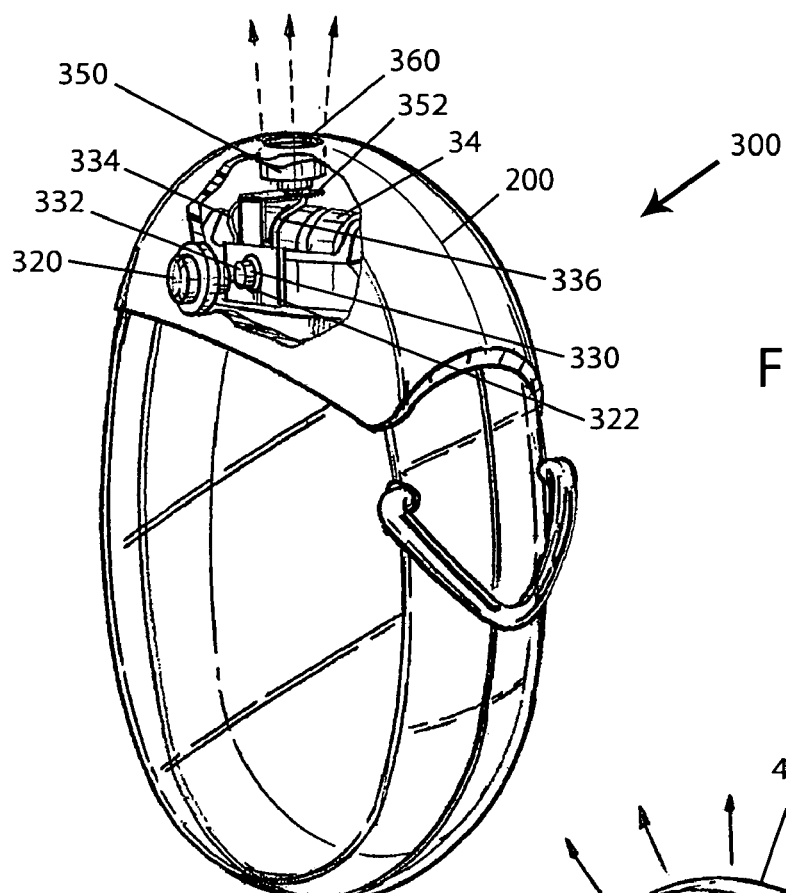
FIG. 10 is a perspective view, in partial cut-away of an illumination device according to another embodiment that includes a flash light feature incorporated into the cap thereof.

Now turning to FIG. 10 in which an illumination device 300 according to another exemplary embodiment is illustrated. The illumination device 300 is similar to the illumination device 100 with the exception that the illumination device 300 includes an added light feature. Thus, like components between devices 100, 300 are numbered alike. In the illumination device 300, the cap 200 is modified, as shown, to accommodate a safety and locating light 310. The light 310 can be selectively operated by the user to illuminate an object or area away from the illumination device 300. The light 310 is preferable configured so that the cap 200 is freely pivotable so as so provide access to the power source 34 as previously discussed. One exemplary light mechanism 310 is of a push button type that includes a push button 320 that has an innermost surface 322 that makes contact with a switch 330. The switch 330 is operatively coupled to the power source 34 and preferably is located adjacent one face of the illumination module 160. The switch 330 includes a depressible part or button 332 which is aligned with the innermost surface 322 of the push button 320 so that when a user presses the push button 320, the innermost surface 322 makes contact and depresses the button 332. The switch 330 includes a first conductive lead 334 and a second conductive lead 336. The first conductive lead 334 is connected to a first terminal of the power source 34 and the second conductive lead 336 is connected to the other terminal of the power source 34 such that when the button 332 is depressed a completed circuit results. The light mechanism 310 also preferably includes a support 340 that is operatively connected to the switch 330 and more particularly to one of the conductive leads 334, 336. In the illustrated embodiment the support 340 is in the form of an L-shaped bracket that includes a first planar portion 342 which can be connected to one end of the conductive lead 336.

The light mechanism 310 further includes a conventional small light bulb 350 that has a conductive contact 352. The light bulb 350 is incorporated into the cap 200 in such a manner that the light bulb 350 travels with the cap 200 as it is opened and closed. In other words, the light bulb 350 can be at least partially embedded and secured in a recessed portion in the cap 200 are such that when the light mechanism 310 is activated the light bulb 350 illuminates and light is transmitted through a thin transparent lens or covering 360 that can also be part of the cap 200. When the cap 200 is in the closed position, the contact 352 of the light bulb 350 seats flush against the planar portion 342 of the support 340 and therefore, the light bulb is operative yet selectively connected to the power source 34. To illuminate the light bulb 350, the user simply has to depress button 320 which itself depresses. button 330 and results in a completed or closed circuit and power is delivered to the light bulb 350 from the power source 34. The button 320 is preferably located in a side face of the cap 200 and is of the type that is resilient in manner such that once the user releases the pressure thereon the button 320 returns to its original state, thereby resulting in button 330 likewise returning to its original state causing the circuit to be opened and the light bulb 350 is no longer illuminated.

Figure 11:
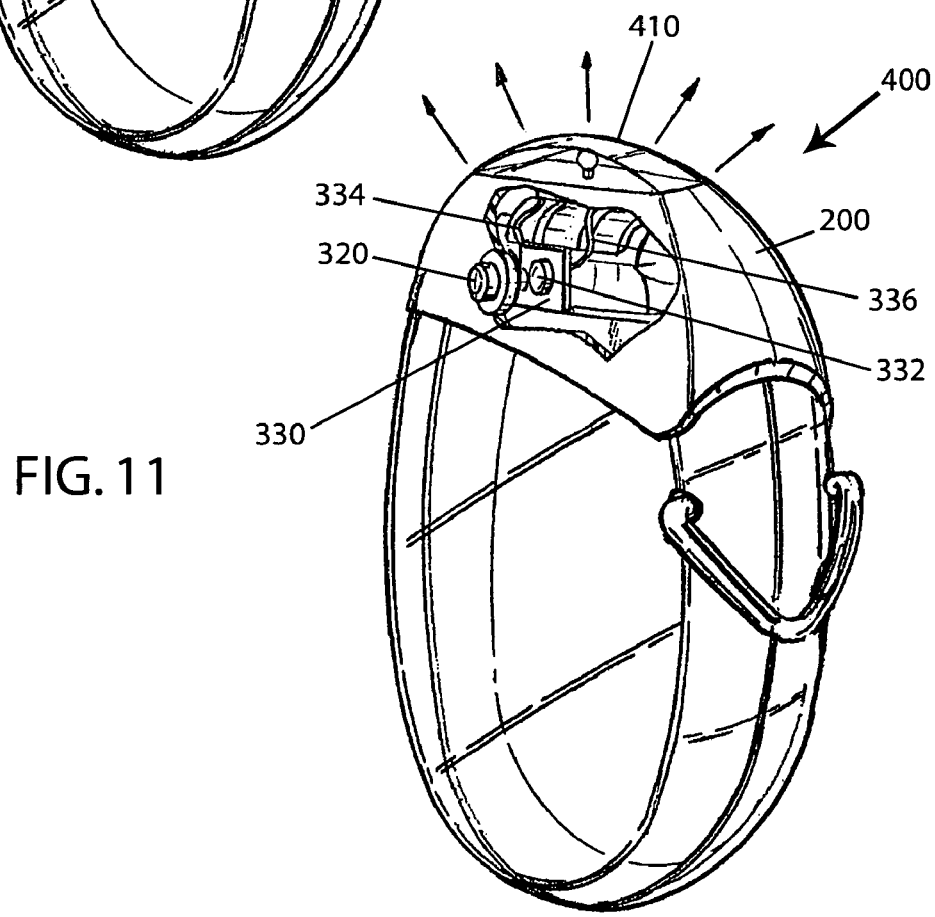
FIG. 11 is a perspective view, in partial cut-away of an illumination device of yet another embodiment that includes a flash light feature of another embodiment which is incorporated into the cap.

Now turning to FIG. 11 in which an illumination device 400 is illustrated. The illumination device 400 is similar to the illumination device 300 with the exception being the construction of the light mechanism. In this embodiment, the lead 336 is directly connected to a light bulb tip cap module 410. More specifically, the lead 336 is connected to a conductive contact of the module 410. It will be appreciated that the length of the lead 336 is sufficient to permit the cap 200 to assume an open position since there is a direct connection at all times between the switch 330 and the light bulb module 410. The device 400 operates in the same manner as the device 300 in that the user nearly presses on the button 320 to illuminate the module 410 and releases the button 320 to deactivate the module 410.

The devices 300 and 400 both offer an added safety or locating feature in that the user can quickly and easily activate a light source, in the form of a small light bulb, to locally illuminate an object or an area surrounding the user. For instance after the user has found his or her set of keys using the locating feature described here and before, the user may then need to find another object or may wish to illuminate a lock or the like to make is easier for the user to open this lock.

FIGS. 12-15B illustrate yet another illumination device 500 that is similar to the illumination device 100 of FIGS. 6-10. In this embodiment, the device 500 includes a cap 510 that is not a pivotable cap, as cap 200, but rather engages and is coupled to the waveguide body 110 in a snap-fit manner. The cap 510 does not include a hinge element but rather has an arcuate body that is hollow, with an interior compartment or cavity 520 that is formed therein for receiving the illumination module 160 when the cap 510 is in the closed position. On the bottom underside surface of the cap 510, the pair of bosses or ridges or tabs 220 is formed and is complementary to the slots 150. The bosses 220 and the slots 150 are orientated so that as the cap 510 closes, the tabs 220 travel along the side walls of the platform 120 and drop into the slots 150, resulting in a frictional, snap-fit manner. In addition, when the tabs 220 are disposed in the slots 150, the bottom edge 202 of the cap 510 seats against the lip 130 as shown in FIG. 15A.

The snap-fit coupling between the cap 510 and the waveguide body 110 is releasable since the user can simply remove the cap 510 by manipulating the cap 510 relative to the body 110. For example, the cap 510 can be pressed inwardly so as to dislodge the tabs 220 from the slots 150 or the cap 510 or the bottom edge 202 of the cap 510 can be pressed upwardly so as to dislodge the tabs 220 from the slots 150.

Figure 15A:
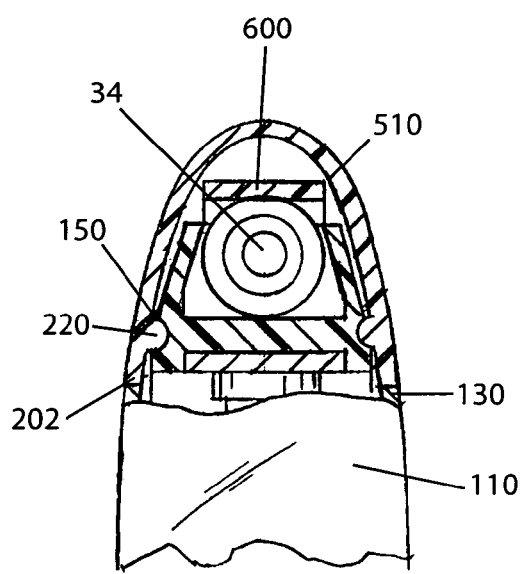
FIG. 15A is a cross-sectional view taken along the line 15-15 of FIG. 14 showing a cap according to a first embodiment.
Figure 15B:
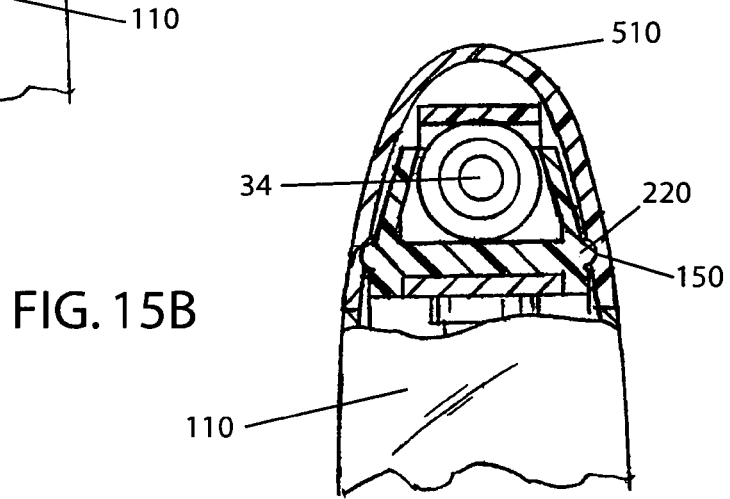
FIG. 15B is a cross-sectional view taken along the line 15-15 of FIG. 14 showing a cap according to a second embodiment.

It will also be appreciated that in another embodiment shown in FIG. 15B, the tabs 220 and slots 150 can be reversed in that the cap 510 can have the slots 150 formed as a part thereof on the bottom underside surface 212, while the side walls of the platform 120 have the tabs 220 formed as a part thereof. The two mate together in the same manner in that when the cap 510 is closed, the tabs 220 travel along the bottom underside surface of the cap 510 until the tabs 220 drop into the slots 150 to thereby snap-fittingly couple the cap 510 to the waveguide body 110.

The snap-fitting arrangement between the cap 510 and the body 110 is of sufficient strength such that during normal operation and use of the illumination device 500, the cap 510 remains coupled to the body 110 in the closed position. It is expected that the cap 510 is removed only during normal maintenance, such as replacing the batteries 34 (power supply) or to access the illumination module 160 to diagnose any problems therewith.

Figure 12:
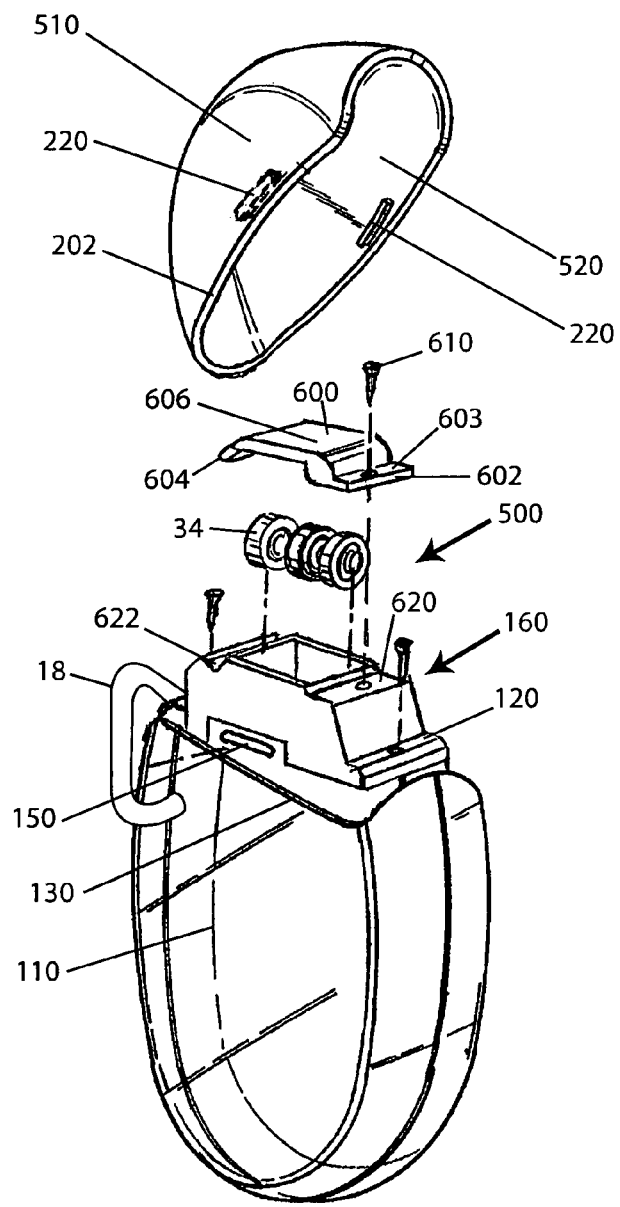
FIG. 12 is a partially exploded perspective view of an illumination device according to yet another embodiment with a cap thereof being shown in an open position.
Figure 13:
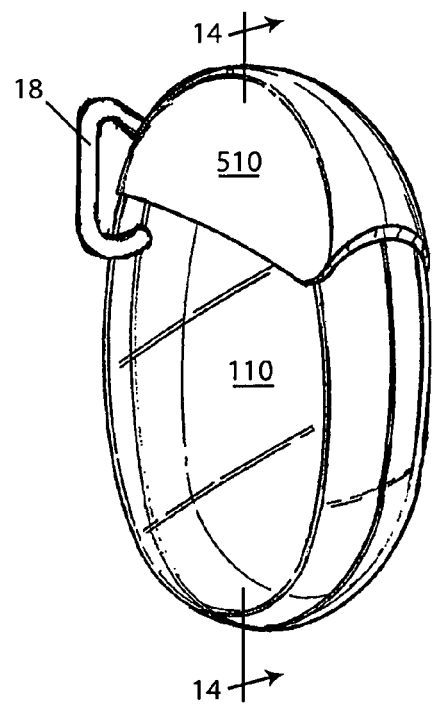
FIG. 13 is a perspective view of the illumination device of FIG. 12 with the cap shown in the closed, locked position.
Figure 14:
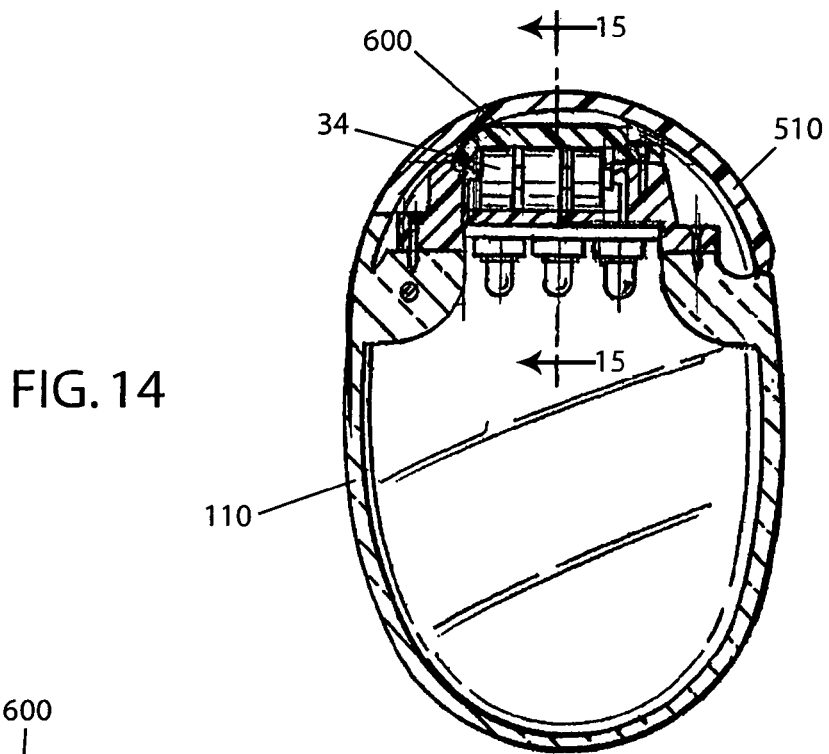
FIG. 14 is a cross-sectional view taken along the line 14-14 of FIG. 13.

In yet another aspect of the present invention, the device 500 includes a protective cover 600 that is securely attached to the illumination module 160 so as to securely hold and prevent easy access to the batteries 34. In one embodiment, the cover 600 is attached to the top surface of the illumination module 160 using a fastener 610. For example and as shown in FIGS. 12 and 14, the cover 600 can include a first end 602 that is in the form of a planar lip or tongue 603 that seats on a planar landing 620 formed along the upper surface of the illumination module 160. The landing 620 is formed at one end of the illumination module 160 next to the compartment that holds the power source 34. The cover 600 has an opposing second end 604, with a raised middle section 606 being formed between the first and second ends 602, 604. The second end 604 can be the terminating end of a beveled section 608 and can be constructed to be received in a complementary channel 622 that is formed in the top surface of the illumination module 160 next to the battery compartment and opposite the landing 620. The second end 604 and channel 622 can be thought of as locating features that properly locate the cover 600 relative to the illumination module 160 such that after the second end 604 is disposed in the channel 622, the first end 602 is merely lowered into place on the landing 620 and openings formed in the lip 603 and landing 620 are axially aligned to receive the fastener 610 (e.g., a screw) to securely attach the cover to the illumination module 160 and cover the batteries 34.

The middle section 606 is raised to accommodate the height of the batteries 34 such that when the cover 600 is securely attached to the top surface of the illumination module 160, the middle section 606 is disposed above the batteries 34.

The illumination module 160 is preferably the same as the ones described previously with respect to the earlier embodiments except that the illumination module 160 includes a plurality of LEDs 44. For example, the illustrated embodiment includes three LEDs 44 and in particular, the three LEDs 44 each has a different color. In one embodiment, each of the three LEDs 44 is a primary color, e.g., red, yellow, and blue. According to one aspect of the present invention, the illumination module 160 is configured so that the LEDs 44 can be illuminated sequentially, each for a selected period of time, or two of the LEDs 44 can be simultaneously illuminated and in this manner, a new color can be generated and directed towards the body 110 for illumination thereof. In other words and according to the present invention, a secondary color can be generated to illuminate the body 110 in this color. For example, the illumination pattern that is set in the control module (printed circuit board) can be configured so that the red and yellow colored LEDs 44 are illuminated simultaneously so as to form an orange color in the illumination body 110. Similarly, to form a green color in the illumination body 110, the blue and yellow primary colored LEDs 44 are illuminated simultaneously; to form a violet color, the red and blue primary colored LEDs 44 are illuminated simultaneously.

Alternatively, the LEDs 44 are not limited to being primary colors but can be a mixed of primary colors and secondary colors. For example, the three LEDs 44 can have red, green, and blue colors.

The illumination module 160 is also configurable so that the illumination pattern of the LEDs 44 does not have to be homogenous but rather, the illumination time that each LED 44 is illuminated can be different so as to provide a different visual appearance. For example, each LED 44 can be either illuminated for a first period of time that gives the appearance of a constant illumination of the LED 44 (constant illumination mode) or the LED 44 can be illuminated for a much shorter second period of time that gives the appearance of a quick blinking LED (blinking mode). It will be appreciated that there are a substantial number of different variations of illumination patterns since the illumination device 500 can have a multi-colored sequential constant illumination mode, where one LED 44 is illuminated for the first period of time before one or more other LEDs 44 are each illuminated for the first period of time.

Similarly, the blinking mode can be multi-colored in that one LED 44 blinks and then subsequently one or more other LEDs 44 blinks. The number of total illumination modes upon occurrence of an operating triggering event (e.g., movement of the device 500) is variable and therefore, it is possible to first have a constant illumination mode followed by a blinking mode (or vice versa) and then optionally followed by another illumination mode. It will be appreciated that when 3 or more modes are provided per occurrence of one triggering event, there can be two modes of one type (either constant or blinking) and one mode of the other type, with the two modes of the same type not necessarily being identical. For example, the mode pattern can be a first constant illumination mode, a blinking mode and then a second constant illumination mode that is different than the first constant illumination mode. Conversely, the first and second constant illumination modes can be identical. It will further be appreciated that within either the constant illumination mode or the blinking mode, the same LED 44 can be illuminated more than once. For example, in the blinking mode, the following blinking sequence can be performed: red, blue, yellow, red, blue, and yellow or another pattern can be: yellow, blue, red, yellow, red or another pattern can be: blue, blue, red, red, yellow and yellow.

It will also be appreciated that the specific illumination pattern within one mode can be varied and defined in a number of different ways. For example, within one mode, one or more of the LEDs 44 is illuminated but not necessarily all of the LEDs 44. In other words, even if there are three LEDs 44, not all of the LEDs 44 need to be illuminated during operation of one illumination mode. Thus, if there are red, blue and yellow LEDs 44, the constant illumination mode can include the red LED 44 being illuminated constant for the first period of time and the yellow LED 44 being illuminated for the second period of time before a blinking mode is performed.

According to one example of the present invention, the illumination device has a constant illumination mode followed by a blinking mode in which during the constant illumination mode, two primary color LEDs 44 are illuminated at the same time to produce a secondary color that is illuminated in the body 110 for a predetermined period of time. While it is possible to produce a secondary color during the blinking mode as by simultaneous illumination of two primary colors, it is more likely that the simultaneous illumination of two primary color LEDs occurs during the constant illumination mode. Thus, the constant illumination mode can be defined by illumination of the red LED 44 for a period of time, simultaneous illumination of red and yellow LEDs 44 for a period of time to produce an orange color in the body 110.

The blinking mode can be defined by a number of rapidly successive illuminations of the LEDs which can be successive along the line of LEDs (one after another so as to give a snake effect) or the LEDs 44 can blink in a random pattern. For example, the blinking pattern can be red, yellow, blue, red, yellow, blue or it can be red, blue, yellow, red, blue, yellow.

What is claimed is:

1. An illumination device to be affixed to an article, said illumination device comprising:
    a main translucent body member that is freely movable;
    an illumination module that is coupled to said main translucent body member, said illumination module including at least one LED and a movement sensor for generating a trigger signal in response said main translucent body member moving at a predetermined degree of acceleration;
    a cap that is pivotally coupled to the main translucent body member and movable between an open position and a closed position, wherein in the open position, the illumination module is accessible underneath the open cap;
    a controller for controlling the illumination of said LED, said controller activating in response to said movement sensor generating said trigger signal, said LED being positioned relative to said main translucent body member so that illumination of said LED is directed through said main translucent body member; and
    a fastener connected to said main translucent body member, said fastener allowing mechanical securement between said device and said article.

2. The illumination device of claim 1, wherein the cap is hingedly attached to the main translucent body member.

3. An illumination device to be affixed to an article, said illumination device comprising:
    a translucent first body member, said body forming a majority portion of said device;
    a second body member that is releasably snap-fittingly coupled to one end of the first body member;
    an illumination module including:
    at least one LED located adjacent to said first body member;
        a movement sensor affixed to said first body member, said movement sensor generating a trigger signal in response to a predetermined magnitude of acceleration applied to said first body member; and
        a controller for controlling the illumination of said LED, said controller activating in response to said movement sensor generating said trigger signal, said illumination of said LED being directed through said translucent first body member; and
    a fastener connected to said body, said fastener allowing mechanical securement between said device and said article, wherein said second body member includes a first interlocking feature that is complementary to a second interlocking feature that is associated with the first body member to permit the two bodies to be releasably snap-fit to one another, wherein when the second body member is removed at least a power source of said illumination module is accessible.

4. The illumination device of claim 3, wherein the first interlocking feature is one of a slot and a protrusion and the second interlocking feature is one of a complementary protrusion and a slot, respectively.

5. The illumination device of claim 3, wherein the first body member includes a platform on which the illumination module is mounted.

6. The illumination device of claim 5, wherein the second body member is in the form of a cap that has a perimeter edge that rests on a lip formed as part of the first body member with the platform being formed between the lip.

7. The illumination device of claim 6, wherein the lip is angled and slopes downward relative to the platform.

8. The illumination device of claim 3, wherein the second body member is formed of a transparent material.

9. The illumination device of claim 3, wherein the second body member is formed of an opaque material so as to obscure view of the power source.

10. The illumination device according to claim 3, wherein said first body member is formed as a single-piece of material and said LED, said movement sensor, and said controller are all connected to a common substrate, defining the illumination module.

11. The illumination device according to claim 3, wherein said at least one LED includes three LEDs, each emitting a different color light into said body.

12. The illumination device according to claim 3, wherein said controller includes a processor, a LED driver circuit, and a timing circuit.

13. An illumination device to be affixed to an article, said illumination device comprising:
    a translucent first body member, said body forming a majority portion of said device;
    a cap that is snap-fittingly coupled to one end of the first body member;
    an illumination module including:
        at least two LEDs located adjacent to said first body member;
        a movement sensor affixed to said first body member, said movement sensor generating a trigger signal in response to a predetermined magnitude of acceleration applied to said first body member; and
        a controller for controlling the illumination of said at least two LEDs, said controller activating in response to said movement sensor generating said trigger signal, said illumination of said at least two LEDs being directed through said translucent first body member, wherein said controller is configured so that said at least two LEDs can be illuminated successively in a first mode and simultaneously in a second mode to produce a mixed color that is visible through the translucent first body member; and a fastener connected to said body, said fastener allowing mechanical securement between said device and said article.

14. The illumination device of claim 13, wherein the cap includes a first interlocking feature comprising one of a slot and a protrusion and the first body member includes a second interlocking feature comprising a complementary protrusion and slot, respectively, such that the first and second interlocking features releasably mate in a snap fit manner to attach the cap to the first body member.

15. The illumination device of claim 13, wherein the first body member includes a platform on which the illumination module is mounted.

16. The illumination device of claim 13, wherein the cap is formed of an opaque material.

17. The illumination device of claim 13, wherein said cap includes a first interlocking feature that is complementary to a second interlocking feature that is associated with the first body member to permit the two bodies to be releasably snap-fit to one another, wherein when the cap is removed at least a power source of said illumination module is accessible.

18. The illumination device of claim 17, wherein the first interlocking feature is one of a pair of slots and a pair of tabs and the second interlocking feature is complimentary and is one of a pair of tabs and a pair of slots, respectively.

19. The illumination device of claim 13, wherein the at least two LEDs comprises three or more LEDs with two LEDs having primary colors such that during the second mode, two primary colored LEDs are simultaneously illuminated to form a secondary color that is visible through the first body member.

20. The illumination device of claim 13, wherein the first mode is a mode where each LED is illuminated for a first period of time and the second mode is a mode where each LED is illuminated for a second period of time which is significantly less than the first period of time so as to produce a blinking effect in the second mode.

21. The illumination device of claim 13, wherein in the first mode, at least three LEDs are illuminated successively each for the first period of time and in the second mode, at least three LEDs are illuminated successively each for the second period of time.

22. The illumination device of claim 13, wherein the mixed color is a secondary color.

23. The illumination device of claim 13, further including a removeable cover for covering the power source, the cover having a planar section for seating against a planar landing formed along an upper surface of the illumination module and a first locating feature that mates with a second locating feature formed as part of the upper surface of the module when the cover is securely attached to the illumination module.

* * * * *